Nov. 3, 1942.  H. C. LIMBACH  2,301,059
LAWN MOWER
Filed Aug. 12, 1939   4 Sheets-Sheet 1

INVENTOR
Henry C. Limbach.
BY Harness, Dickey & Pierce.
ATTORNEYS.

Nov. 3, 1942.  H. C. LIMBACH  2,301,059
LAWN MOWER
Filed Aug. 12, 1939  4 Sheets-Sheet 2

INVENTOR
Henry C. Limbach
BY
Harness, Dickey & Pierce
ATTORNEYS.

Nov. 3, 1942.    H. C. LIMBACH    2,301,059
LAWN MOWER
Filed Aug. 12, 1939    4 Sheets-Sheet 4

FIG.10.

INVENTOR
Henry C. Limbach.
BY Harness, Dickey & Pierce.
ATTORNEYS.

Patented Nov. 3, 1942

2,301,059

UNITED STATES PATENT OFFICE 2,301,059

LAWN MOWER

Henry C. Limbach, Detroit, Mich., assignor to Product Development Quest, Inc., Detroit, Mich., a corporation of Michigan Application August 12, 1939, Serial No. 289,741

12 Claims. (Cl. 56—253)

This invention relates to lawn mowers and particularly to a handle construction therefor and is a continuation in part of my application for Letters Patent of the United States for Improvements in lawn mower, filed June 23, 1937, Serial No. 150,712, now Patent No. 2,199,919, granted May 7, 1940.

Objects of the invention include the provision of a lawn mower having a handle pivotally mounted thereon in a new and novel manner; the provision of a lawn mower having a handle pivotally secured thereto at a point which will eliminate the jumping or bucking of the lawn mower under certain conditions as occurs in conventional lawn mowers; the provision of a lawn mower having a handle pivotally secured thereto at such a point that the line of propulsive effort applied by the operator to the mower through the handle will intersect the ground at a point approximately on the line of contact between the driving wheels and the ground or at a point between such line and the ground roller; and the provision of a lawn mower construction having a handle pivotally mounted thereon in such position that the propulsive effort applied to the mower through the handle is applied in a plane parallel to the wheel axes and intersecting the ground between the point of contact of the wheels with the ground and the ground roller.

Other objects of the invention include the provision of a lawn mower provided with a propelling handle pivotally secured thereto, the lawn mower and the handle being so constructed and arranged that the point of pivotal connection between the handle and the lawn mower may be varied with respect to the height thereof above the ground; the provision of a lawn mower having a handle pivoted thereto at such a point thereon that force applied to the mower through the handle and the pivotal connection of the handle with the mower intersects the ground at a point forwardly of the ground roller but not materially in advance of the line connecting the points of contact to the wheels with the ground and in which adjustment of the mower to effect an increase in the height of cut thereof tends to move the point of intersection of said line of force rearwardly as the height of cut is increased; the provision of a lawn mower construction as above described in which adjustment of the mower to increase the height of cut thereof acts to raise the axis of the cutter reel vertically with respect to the axial line of pivot between the handle and the mower.

Still further objects of the invention include the provision of a lawn mower construction having a handle pivotally secured thereto and in which adjustments in the vertical height of cut of the mower has no effect on the position of the pivotal axis between the handle and the mower with respect to the ground; and the provision of a lawn mower having a handle pivotally secured thereto for propelling the same and in which the axis of the pivotal connection between the handle and the mower remains stationary vertically during variations in the height of cut of the mower.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

As commonly understood in the art in manually operated types of lawn mowers it is conventional practice to provide a handle whereby the lawn mower may be manually pushed ahead of the operator and these handles are conventionally pivoted to the frame of the lawn mower. As far as can be determined prior to the present invention the point of pivotal connection between the handle and the mower proper has been along a line lying in a horizontal plane positioned vertically above a horizontal plane including the axes of the wheels, or at least the line of pivotal connection between the handle and the mower has been such that the line of force exerted by the operator on the handle and transmitted through the pivotal line intersects the ground in advance of the line of contact joining the points of contact of the opposite wheels with the ground, so that any unusual resistance to the forward motion of the lawn mower tends to rock the lawn mower about the line of contact of the wheels with the ground and causes the lawn mower to buck or jump, resulting in uneven and unsatisfactory cutting performance. Furthermore, in conventional lawn mowers the pivot line between the handle and the mower is located between the ground roller and the center of the wheel and rearwardly of the cutting edge of the cutter bar provided for cooperation with the usual cutter reel and as a result when the mower is adjusted to increase the height of cut thereof the line of pivotal connection between the handle and the mower is raised with respect to the ground to a greater extent than the increase in the height of cut and, accordingly, aggravates the undesirable conditions above referred to.

The present invention is designed to overcome the disadvantages of conventional lawn mowers as above described and this is accomplished by so arranging the line of pivot between the handle and the mower proper that the line of force exerted on the mower through the handle and passing through the pivotal line intersects the ground at a point approximately in line with the line connecting the points of contact of the wheels with the ground, or at some point rearwardly thereof, the force thus applied to the handle tending to maintain both the wheels and the ground roller in contact with the ground and effectively preventing the bucking or jumping referred to so common in conventional constructions.

Additionally where the arrangement of pivotal connection between the handle and the mower is applied to a lawn mower of the character disclosed in my issued Patent No. 2,091,077, as well as my co-pending application Serial No. 150,712, now Patent No. 2,199,919, above referred to and of which the present invention is a continuation in part of the latter, as the height of cut of the mower is increased the point of intersection of the line of force exerted through the handle to the mower through the pivotal connection therebetween moves rearwardly with respect to the ground wheels when the handle is connected directly to the frame, and where the handle instead of being connected directly to the frame is connected to the chain or gear housing of this type of lawn mower, variations in the height of cut of the mower have no effect whatever upon the point of intersection of such line of force to the handle with the ground.

As a matter of convenience in illustrating the principles of the present invention the same is shown in the accompanying drawings and particularly in Figs. 1 to 9 thereof as being identical to the lawn mower shown in the corresponding figures of my co-pending application above referred to, although it is to be understood that the present invention is likewise illustrated in my issued patent above referred to although not there claimed, and may be equally well applied in a more limited sense to lawn mowers of conventional construction. Accordingly, the particular lawn mower shown in the drawings is to be considered as shown in an illustrative and not in a limiting sense.

Figures 1, 2:
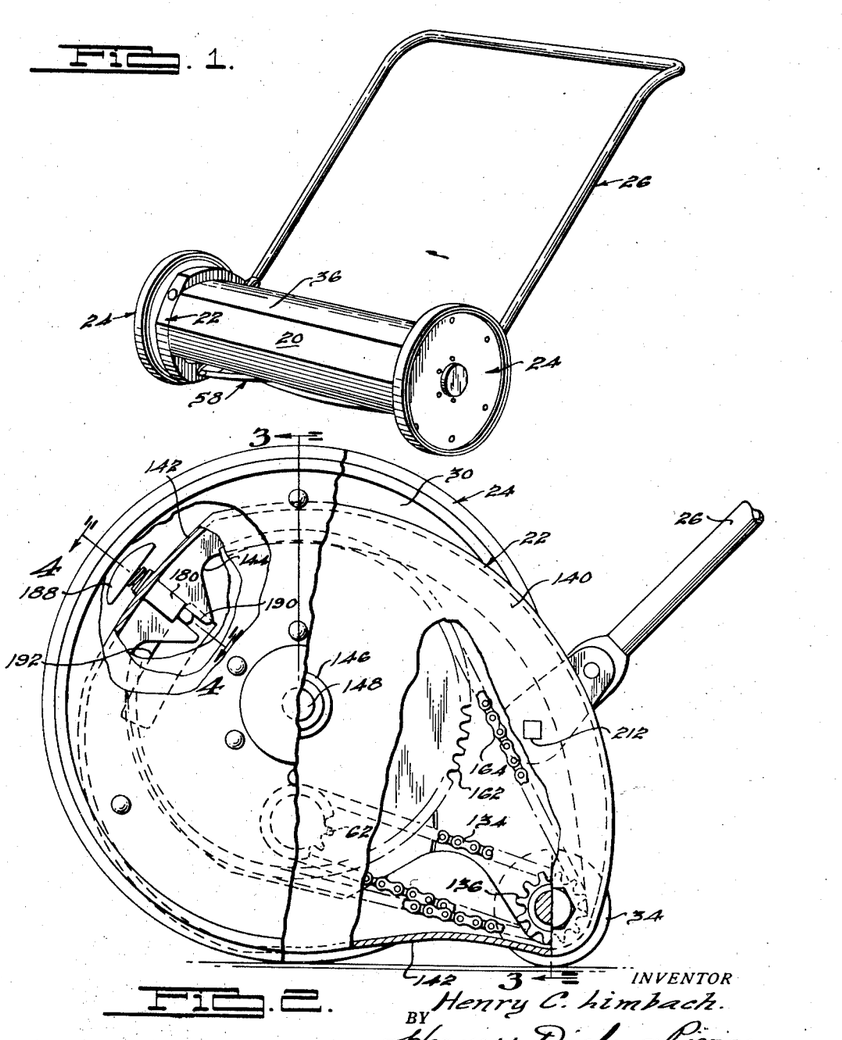
Figure 1 is a perspective view of a lawn mower embodying various features of the present invention.
Fig. 2 is an enlarged partially broken, partially sectioned end elevational view of the lawn mower shown in Fig. 1.
Figure 3:
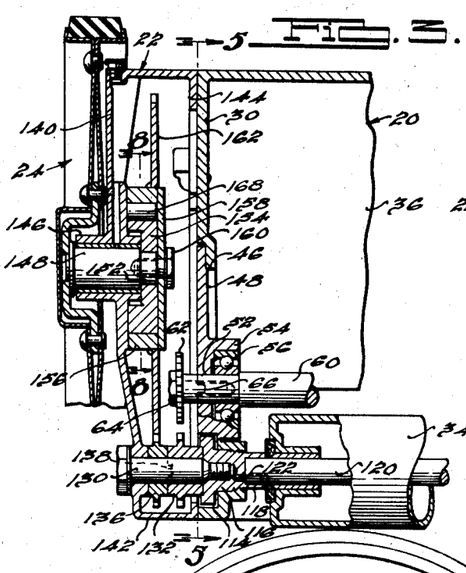
Fig. 3 is a fragmentary sectional view taken on the line 3—3 of Fig. 2.
Figure 5:
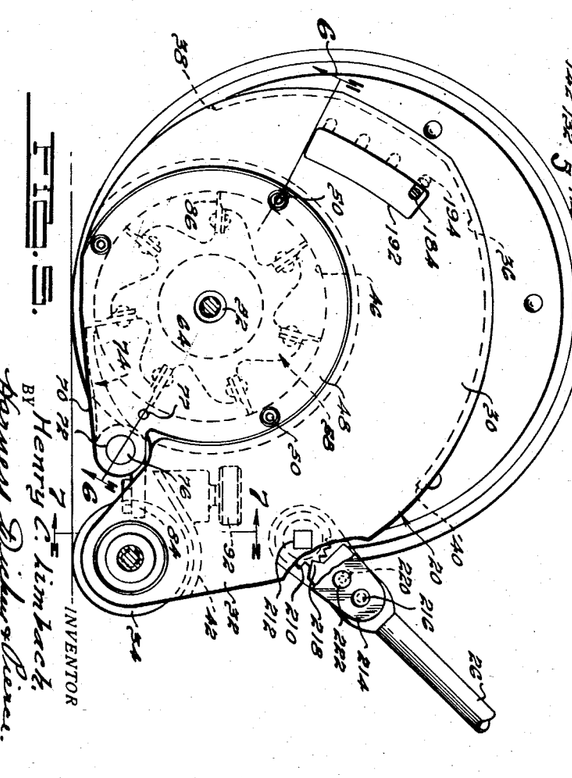
Fig. 5 is a vertical sectional view taken on the line 5—5 of Fig. 3.

Referring to the drawings and particularly to Fig. 1 the lawn mower there shown includes a main frame unit indicated generally at 20 provided at either end thereof with a pivotally connected chain housing indicated generally at 22 each of which is provided outwardly thereof with a driving and supporting wheel indicated at 24, together with a handle structure indicated generally at 26, the specific details of each of which will hereinafter be described in detail. Referring now particularly to Figs. 3 and 5, it will be noted that the main frame unit 20 includes a main frame member having opposed parallel substantially flat end portions 30 and each of which, as indicated in Fig. 5, is provided with a rearward and downward extending projecting portion or tail 32 and between which the fulcrum roll 34, to be hereinafter more fully described, extends and is rotatably mounted. The end plate portions 30 are rigidly and immovably secured together over their forward and upper peripheral portions by means of a curved wall 36 preferably formed integrally therewith and extending from a point or horizontal line 38 at the front of the mower sufficiently high to permit grass of normally maximum height adapted to be cut by the mower to enter therebelow, and to a point 40 at the rear of the mower at a sufficient height above the ground to permit the cut grass discharged by the cutter reel to be thrown outwardly and upwardly into a grass catcher when employed. An additional curved wall 42 extends between and is integrally connected to the tail portions 32. Because of the curved nature of the walls 36 and 42 and their relatively great combined width, and particularly in view of the fact that the wall 36 is extended to such an extent as to be substantially semi-cylindrical in conformation it will be understood that the main frame member is of exceedingly rigid nature and of such strength and rigidity as to be substantially unyieldable to any shocks or blows that a lawn mower may be expected to encounter during usual but rough usage. This main frame member may be well likened in its nature to a barrel in which slots, corresponding to the spaces left between the edge 38 and the adjacent edge of the wall 42 and the edge 40 and the adjacent edge of the wall 42 are formed to permit the entrance of the grass to the cutter reel and the ejection of the cut grass therefrom, and it will have the strength of construction and the resistance to deformation, distortion and warpage that is expected to be found in a barrel-like structure. This frame structure may be of cast construction in which event the end walls 30 and connecting walls 36 and 42 will preferably be cast integrally therewith, or may be made separately of plates or stampings in which case they will preferably be riveted or welded together.

Each end portion 30 of the main frame is provided in its lower portion with a preferably circular stepped opening 46 therein and received in each of the openings 46 and accurately piloted therein with its outer surface preferably in flush relationship with the outer surface of the corresponding portion 30, as indicated in Fig. 3, is a generally plate-like member 48. The members 48 are each secured rigidly with respect to their corresponding end portions 30 by means of a plurality of screws 50, best indicated in Figs. 5 and 6 and the heads of which are preferably located in flush relation with respect to the outer face of the corresponding portions 30 and members 48 as indicated in Fig. 6.

Figure 6:
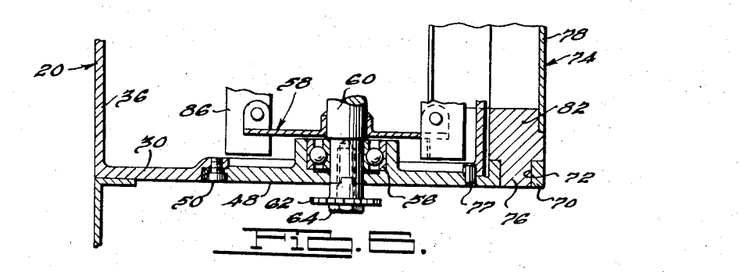
Fig. 6 is a fragmentary sectional view taken axially of the cutter reel of the lawn mower as on the line 6—6 of Fig. 5.

As best indicated in Figs. 3, 5 and 6 each plate member 48 is provided with an aperture 52 therethrough, and although not necessary or even desirable under some circumstances it is shown in the drawings as being located centrally of the plate member 48. On the inner face of each plate member 48 surrounding the corresponding opening 52 is an inwardly projecting annular boss 54 within which a suitable anti-friction bearing assembly 56 is located and secured. The cutter reel which is indicated generally at 58 and which may be of generally conventional construction is provided with a shaft 60, the opposite end portions of which are rotatably received within the corresponding bearings 56 and the outer ends of the shaft 60 project outwardly into substantially flush relationship with the outer face of the corresponding plate members 48. A chain sprocket 62 is located axially of and secured to the outer face of each end of the shaft 60 by means of a screw 64 and a tongue and groove connection 66 provided between the hub of each sprocket and the corresponding end of the shaft 60 forms the driving connection between the sprockets 62 and the cutter reel. The diameter of at least one of the openings 46 in the end portions 30 of the main frame is sufficiently large to permit insertion and removal of the cutter reel 58 therethrough upon removal of the corresponding plate member 48.

As indicated best in Figs. 5 and 6 each plate member 48 is provided at its lower rearward portion with a rearwardly extending projection 70 provided with an opening 72 therethrough. The apertures 72 are each formed with their axis parallel with respect to the axis of the bearing 58 in the corresponding plate 48 and at an accurately gauged center distance between them. The cutter bar which is indicated generally at 74 is provided with a relatively short axially projecting journal or pin portion 76 at the opposite ends thereof and each journal portion 76 is rotatably received in the corresponding opening 72. Accordingly, it will be observed that the plate members 48 accurately space the cutter reel 58 from the cutter bar 74 and it will be apparent that because of the relatively large area of contact between each plate member 48 and its corresponding end wall portion 30 of the main frame member, when these parts are accurately located with respect to each other and locked in their assembled position it will be substantially impossible in any ordinary rough usage of the lawn mower to so spring, distort or otherwise rack this portion of the lawn mower sufficiently to disrupt the properly adjusted relation of the cutter bar with respect to the cutter reel.

With the above described construction it will be apparent that the rotatable positions of the plates 48 in the openings 46 of the main frame must be accurately controlled in order to bring the axes of the openings 72 into substantially exact alignment, otherwise it would be impossible to obtain a uniform working clearance between the straight cutting edge of the cutter bar 74 and the cutting edges of the cutter reel 58 over the full length of the cutter bar. This accuracy of location of the plates 48 is obtained during assembly, the cutter reel and cutter bar being mounted therein and adjusted, while the plates 48 are relatively rotatably adjustable in their openings 46, until a uniform clearance between the reel and cutter bar over the full length of the latter is obtained. The plates 48 are then temporarily locked in position, and the overlapping portion of each plate 48 with the end wall 30 of the main frame is then drilled and reamed for reception of a dowel 77 which thereafter serves to accurately locate such plate with respect to the frame. The holes for the screws 50 may then be drilled and tapped and the screws inserted in place, but ordinarily it will be found better manufacturing practice to drill and tap the parts for the screws before assembly, leaving sufficient clearance for the screws to permit the above described rotatable adjustment prior to machining for the dowels.

The cutter bar 74 shown in the drawings comprises a main portion 78 formed from sheet metal into a hollow structure to provide a cutting edge 80 and separately formed end members 82 fitted into the opposite ends of the main body portion 78 and suitably welded, brazed, or otherwise fixed therein. Each of the end members 82 is provided with a rearwardly extending lug portion 84 for the purpose of enabling adjustment of the cutter bar 74 about the axes of its pins 76 in order to adjust the relation between the cutting edge 80 and the various blades 86 of the reel 58.

Figure 7:
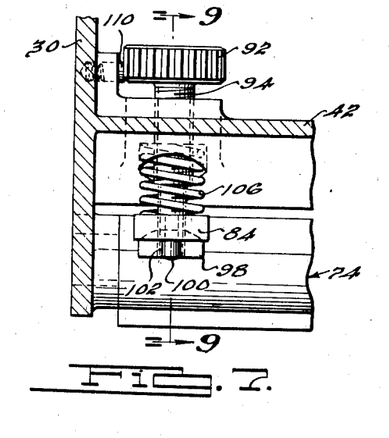
Fig. 7 is an enlarged fragmentary vertical sectional view taken on the line 7—7 of Fig. 5 and illustrating the adjusting mechanism for the cutter bar in greater detail.
Figure 9:
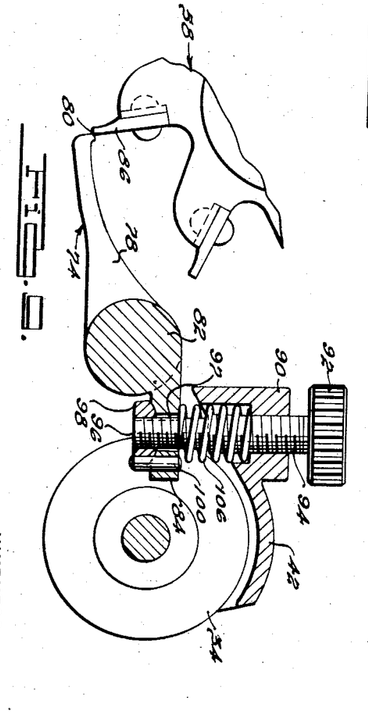
Fig. 9 is a fragmentary transverse sectional view taken on the line 9—9 of Fig. 7; and, Fig. 10 is a view similar to Fig. 2 but illustrating the handle as being secured to the chain housing instead of directly to the frame of the mower.

Adjustment of the cutter bar 74 with respect to the reel 58 is accomplished in the manner indicated best in Figs. 7 and 9 from which it will be noted that the transverse wall 42 immediately above each of the lugs 84 is provided with an upwardly extending boss 90 downwardly through which a screw member 92 is threaded. Each screw member 92 includes a body portion 94 of one diameter and a body portion 96 of a smaller diameter, both portions 94 and 96 being provided with screw threads of the same hand and the portion 96 having more threads per inch than the portion 94. As a matter of illustration it may be assumed that the portion 96 is provided with twenty-four threads to the inch while the portion 94 is provided with twenty threads to the inch. The portion 94 is threadedly received within the boss 90 and the portion 96 passes loosely through an elongated hole 97 in the corresponding lug 84 and is threadably received in a nut 98 lying below such corresponding lug 84. The cooperating faces of the lugs 84 and nuts 98 are spherically curved to permit the nuts 98 to angularly adjust themselves to accommodate the angular position of the cutter bar. A coil spring such as 106 is provided in surrounding relation with respect to each screw 92 and constantly maintained under compression between each lug 84 and its corresponding boss 90 in the manner indicated in Fig. 9 so as to constantly urge the lugs 84 into contact with their respective nuts 98. A pin 100 fixed in each lug 84 is received in a slot 102 in the corresponding nut 98 and prevents the nut from rotating. Inasmuch as the required range of pivotal movement of the cutter bar 74 is extremely small the ability of the nuts 98 to adjust themselves on their seats will ordinarily take care of all the adjustment of the cutter bar required in service, but this range may be increased by providing a somewhat loose fit between the portion 94 of the screw 92 and the boss 90, but the looseness of such fit does not need to be excessive and in any event the spring 106 exerts a material axial force between the threads on the screw 92 and the threads in the boss 90 whereby to normally prevent any axial play between them. In order to prevent any possibility of inadvertent rotational movement of the screws 92 it is preferable, as illustrated in Fig. 7, to provide a spring pressed plunger 110 in the inner face of each corresponding frame portion 30 which is constantly urged outwardly against the serrated outer face of the heads of the screw 92, the end of the plungers 110 being formed to engage in such serrations so as to frictionally hold the screw 92 against turning, yet being of such a nature as to permit it to be turned manually for adjusting purposes. The above described construction also has an important advantage in that in event a stone, stick or the like becomes caught between the cutter reel blades and the cutter bar, the resulting downward pressure on the cutter bar cutting edge will act to compress the springs 106 and allow the cutting edge 80 to temporarily move away from the reel, thus eliminating the possibility of damage to these parts which might occur if they were relatively immovable.

The cutter bar 74 because of its hollow construction will be of maximum strength for the weight of metal provided and of such a nature as to most favorably resist bending and twisting thereof. Likewise the nature of the adjustment for the cutter bar 74 is such as to permit the cutting edges 80 thereof to be accurately controlled to a very minute degree. This, of course, is obtained because of the differential action of the screw 92. This will be particularly understood when it is realized that with the number of threads previously mentioned for the portions 94 and 96 of the screw 92 one full turn of the screw 92 will cause an axial displacement of the lug 84 with respect to the boss 90 of only one 120th of an inch.

As best indicated in Figs. 3 and 5 the outer extremities of each of the tail portions 32 of the end wall portion 30 of the main frame are provided with an inwardly bossed stepped opening 114 therein in each of which is threadably received a member 116 having a hollow inner end portion 118 projecting inwardly beyond the inner face thereof. Supported and located between the hollow extensions 118 is a shaft 120 one end of which is provided with an axially parallel but eccentric pin 122 which is received in a matching opening formed in the member 116 so as to positively lock the shaft 120 from relative rotation with respect to the members 116. Rotatably received upon the shaft 120 and extending between opposite members 116 is the fulcrum roll 34, corresponding to the fulcrum roll shown and described in my copending application above referred to to all intents and purposes.

The outer face of each of the members 116 is centrally provided with a threaded opening in which the threaded inner end of a pin 130 is received and which pin projects axially outwardly therebeyond. Immediately adjacent each member 116 a sprocket member 132 is rotatably received upon the corresponding pin 130 and this sprocket member is connected by means of a chain 134, as indicated in Fig. 2, with the corresponding sprocket 62 on the shaft 60 of the cutter reel 58. Immediately outwardly of each sprocket 132 a second sprocket 136 is rotatably received upon each pin 130 and is provided with a tongue and groove connection 138 with the corresponding sprocket 132 so as to drivingly connect these two sprockets. Outwardly of the corresponding sprocket 136 each pin 130 pivotally receives thereon the chain housing 22 at the corresponding end of the lawn mower.

Referring now to Figs. 2 and 3, it will be noted that each chain housing 22 comprises a hollow member which in side view as illustrated in Fig. 2 is of somewhat the same general contour as the end plates 39 of the main frame and includes an outer wall 140 and a peripheral wall or rim portion 142 bounded at its inner margin with an inturned flange 144, the inner face of which is planular and lies flat against the outer plane face of the corresponding end wall 30 of the main frame.

The outer wall 140 of each housing 22 is provided with a hollow bushed boss 146 whose axis is parallel to and preferably lies in approximately the same vertical plane as the axis of the cutter reel shaft 60 when the mower is adjusted for a normal cut. Each boss 146 rotatably receives therein a spindle member 148 which projects outwardly therefrom and to the outwardly projecting end of which is suitably fixed the corresponding driving wheel 24 which may be of any suitable construction but is shown for the purpose of illustration as being of substantially the same construction as shown in my prior patent application above identified. The inner end of each spindle 148 is reduced as at 152 and non-rotatably received thereon is an inner clutch member 154, shown in greater detail in Fig. 8. Rotatably mounted upon the inner clutch member 154 is an outer ring-like clutch member 156 which is maintained in radially aligned relation with respect to the clutch member 154 by bearing against the suitably machined inner face of the outer wall 140 and a disc-like plate member 158 mounted upon a screw 160 which is threaded into the extension 152 of the spindle 148 centrally thereof. Consequently each screw 160 cooperating with the corresponding plate member 158 also serves to maintain the corresponding clutch member 154 against the shoulder formed at the junction of the main body portion of the spindle 148 and the reduced portion 152 thereof and further serves to secure the corresponding wheel 24 against axial displacement with respect to the corresponding housing 22. Each outer clutch member 156 has suitably secured thereto as by welding a relatively large sprocket wheel 162 aligned with the corresponding sprocket 136 on the pin 130 and drivingly connected thereto by means of a chain 164 as indicated in Fig. 2.

Figure 8:
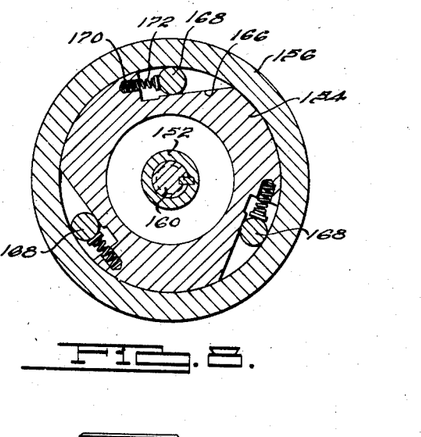
Fig. 8 is an enlarged transverse sectional view taken on the line 8—8 of Fig. 3 and illustrating the construction of the over-running clutch provided between the driving wheels and the cutter reel.

Referring to Fig. 8 each inner clutch member 154 is provided in its periphery with a plurality of triangularly shaped notches 166, three being shown by way of illustration, and in each notch 166 a roller 168 is received with its axis in parallel relation to the axis of the spindle 148. The notches 166 preferably have their walls arranged at right angles to each other and with one wall considerably longer than the other and a hole 170 is drilled into each of the short walls in a direction normal thereto and receives therein one end of a compression spring 172 maintained under compression between the blind end of the hole and the corresponding roller 168. The rollers 168 are of such diameter as to bear both against the long wall of the corresponding notch 166 and the inner surface of the outer ring-like clutch member 156 and towards which position they are constantly urged by the corresponding springs 172. The notches 166 are so arranged with respect to the clutch members 154 that when the wheels 24 are turning in a counterclockwise direction of rotation, as viewed in Figs. 2 and 8, the inner clutch members 154 in turning with the wheels will, because of the friction of the rollers 168 with both the members 154 and 156, tend to cause the rollers to be carried towards the small end of the corresponding notch 156 and consequently lock the clutch members 154 and 156 together for equal rotation whereby the rotational movement of the wheels will drive the sprocket 162 which, acting through the chain 164, sprockets 136 and 132, chain 134 and sprocket 62 will cause the cutter reel 58 to be driven at a relative speed depending upon the driving ratio established by the differences in size and arrangement of these sprockets. This ratio may, of course, be such as to obtain any desired turns of the cutter reel to each complete revolution of the driving wheels, but in the construction shown as a matter of illustration the cutter reel will turn approximately five revolutions to each revolution of the driving wheel during forward movement of the lawn mower. At any time that the momentum of the cutter reel and connected parts tends to drive the wheels 24, or whenever the lawn mower is moved in a rearwardly direction as respects its normal direction of travel, the friction between the rollers 168 and coacting surfaces of the clutch members 154 and 156 will tend to move the rollers 168 in opposition to their corresponding springs 172 towards the deeper end of their respective notches 166 and consequently will release the members 154 and 156 from driving engagement with respect to each other. Consequently the clutch structure illustrated in Fig. 8 provides a one-way clutch between the wheels and the cutter reel of such nature as to drive the cutter reel in one direction only and during forward movement of the lawn mower only for obvious reasons.

Figure 4:
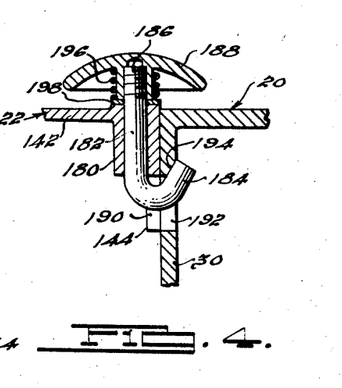
Fig. 4 is an enlarged fragmentary sectional view taken on the line 4—4 of Fig. 2 and illustrating in greater detail the means for locking the wheels in their adjusted position relative to the main frame of the lawn mower.

In view of the fact that the main housing 20 and the chain housings 22 are pivotally mounted with respect to each other about the axes of the pins 130 which are offset from both the axes of the wheels and the cutter reel, and in view of the fact that the cutter reel is carried by the main frame 20 and the wheels carried by the chain housings 22, it will be apparent that relative pivotal movement between the main frame 20 and the chain housings 22 will vary the height of the cutting edge 80 of the cutter bar 74 with respect to the ground and consequently the height of cut of the lawn mower may be adjustably controlled by controlling the pivotal relationship between these parts. In order to enable both chain housings 22 to be adjusted to the same relative position with respect to the main frame 20 and to be locked in such adjusted position, the wall 142 of each housing 22 at a point thereon substantially at the greatest distance from the pivotal point of the housing is interiorly provided immediately adjacent the flange 144 with an inwardly projecting hollow boss 180 in which is axially slidably received a rod 182 the inner end of which is bent into a hook 184 and the outer end which projects outwardly beyond the outer face of the housing 22 is threaded as at 186 and receives thereon a hand nut 188. The flange 144 of each housing 22 is deepened adjacent the boss 180 and is notched at its inner edge as at 190 for reception of the corresponding hook end 184 thereby to prevent its rotation, and the corresponding end wall 30 of the main frame 20 is provided with an arcuate slot 192, best shown in Figs. 2, 4 and 5 arranged with its center coincident to the axes of the pins 130 and through which the extreme tip of the corresponding hook end 184 of the rod 182 projects. The axially inner radially outer edge of each slot 192, as best indicated in Fig. 5, is provided with a plurality of spaced notches 194 in which the corresponding hooked end 184 is receivable. As illustrated in Fig. 4 when the hooked end 184 is received in one of the notches 194 and the hand nut 188 is tightened down on the end of the corresponding rod 182 the hooked end 184 in being drawn outwardly by the nut 188 causes the housings 22 and 20 to be drawn axially toward one another and clamped securely together against pivotal movement with respect to each other and consequently locks the corresponding housing 22 securely in adjusted relation with respect to the main frame 20. Preferably a coiled spring such as 196 provided in surrounding relation with respect to the hub portion of the hand nut 188 is constantly maintained under compression between the hand nut 188 and a suitable washer 198 surrounding the rods 182 between the housing 22 and the hand nut for the purpose of preventing disengagement of the hook 184 with a cooperating notch 194 until the hand nut 188 is pressed inwardly to cause the hook 184 to disengage a cooperating notch 194. The spring 196 is of sufficient strength to maintain the hooked end 184 in the corresponding notch 194 even though the hand nut 188 is backed off a sufficient extent to permit relative pivotal movement between the housings 20 and 22, and thus permits the hook 184 to be temporarily projected into one or another of the notches 194 for trial purposes during adjustment, and without necessitating tightening of the hand nut 188 until the desired position of adjustment has been obtained.

It may be noted at this point that the weight of the lawn mower is transmitted to the ground through the wheels 24 and fulcrum roll 34. Unlike conventional constructions, however, the fulcrum roll 34 has nothing whatever to do with the height of cut produced by the lawn mower, this being for the reason that the line of engagement between the cutting edge 80 of the cutter bar 74 and the cutter reel 58 is approximately in vertical alignment with the axis of the wheels 24 and all adjustments of the height of cut is obtained through adjustment between the main frame member 20 and the housings 22. Having the line of cut in approximate vertical alignment with the axes of the wheels prevents scuffing of the turf and variation in height of cut by the lawn mower in going over a surface which is curved in the direction in which the lawn mower travels, thus eliminating a major fault in conventional constructions. This feature is not any part of the present invention but forms the principal subject-matter of my prior application previously identified herein.

It may also be noted at this point that similar to the construction shown in my prior patent above referred to, simply by releasing the lock between one of the housings 22 and the main frame 20 through suitable loosening and inward pressing of one of the hand nuts 188 and removal of the corresponding screw pin 130, the corresponding housing 22, wheel 24 and cooperating parts may be removed from the corresponding end of the lawn mower and upon further removing the corresponding screws 64 and sprocket 62 such end of the lawn mower will be perfectly flat and will be closely approached by the corresponding end of the cutter reel 58, and yet the lawn mower will be sufficiently supported to permit it to be used for edging purposes, that is, mowing close to a wall or a fence. The special handle construction is provided which will permit the operator to readily maintain that end of the mower from which the wheel has been removed in its proper position with respect to the ground for cutting purposes. Additionally, this handle is so secured, in accordance with the present invention, to the frame as to obtain the object of the present invention heretofore set forth.

Referring now to Figs. 1, 2 and 5, it will be noted that to the inner face of each tail portion 32 of each end wall 30 of the main frame 20 a peripherally serrated, notched or toothed member 210 is fixed against rotation in any suitable manner as, for instance, by means of a squared connection 212. Each member 210 has pivotally secured thereto a rearwardly and upwardly extending arm or link 214. The U-shaped handle 26 has its otherwise free ends pivotally secured to the arms 214 by means of suitable pivot pins 216. The extreme end portions of the handle 26 are each formed to provide an inwardly projecting tooth 218 engageable with the serrated outer surface of the member 210. The relation of these parts is such that when the handle 26 is caused to pivot about the pins 216 in a counter-clockwise direction of rotation as viewed in Figs. 2 and 5, the teeth 218 are caused to become disengaged from the serrated surface of the members 210 upon the occurrence of which the handle 26 and the arms 214 may be moved bodily together about the center of the serrated members 210, in either direction of rotation. When the handle 26 and arms 214 have thus been bodily rotated to a desired position, if the handle 26 is now caused to rotate in a clockwise direction about the pivot pins 216 the teeth 218 will again engage the serrated member 210 which will thereupon lock the handle 26 against further movement in a clockwise direction of rotation about the axes of the members 210. In order to effect this result the point of engagement between the teeth 218 and serrated surface of the members 210 will necessarily have to be one the righthand side of a line connecting the axes of the pins 216 and members 212 as viewed in Fig. 5. Also to permit upward movement of the upper end of the handle 26 to move it sufficiently about the axes of the pins 216 to release the teeth 218 from the periphery of the members 210 yet limit such movement to that not materially greater than required to effect such release and thereby facilitate thereafter the bodily movement of both handle and members 214 about the axes of the members 210, the end portions of the handle 26 at a point intermediate the axes of the pins 216 and members 214 are provided with slots 220 in each of which a pin 222 fixed to the corresponding arm 214 projects. The pins 222, by engagement with the end walls of their corresponding slots 220, limit the relative pivotal movement of the handle 26 with respect to the arms 214. With this construction by a simple upward movement of the outer end of the handle 26, the handle 26 may be moved to any desired position of adjustment including a substantially vertical position for storage or substantially horizontal position for moving under a porch or the like, and the operator by giving the handle 26 a simple breaking type of movement may cause the teeth 218 to again engage the serrated outer surface of the member 210 so as to releasably lock the handle in such adjusted position.

The attachment of the handles to the mower in accordance with the present invention substantially eliminate any tendency of the mower to jump or buck and this is accomplished by positioning the point of connection between the handle and the frame behind the axis of the reel and sufficiently low so that when the handle is in its operating position the central plane along which the force is directed passes behind the reel shaft and, in the preferred embodiment, through or advantageously behind the points of contact between the wheels 24 and the ground.

The considerations which control the novel placing of the handle in a mower of the present invention may be understood by considering the mower first with its wheels blocked against forward movement and secondly with its reel blocked against rotation. The frame, being pivotally connected both to the ground wheels 24 and to the ground roller 34, may turn about either as a fulcrum; and force applied along the handle, therefore, exerts a turning movement about each tending to press the other towards the ground. The relative magnitude of these movements depends upon the relative distances of the pivots of the wheels and roller, respectively, of the plane in which force is applied along the handle to the mower. To increase the downward pressure on the wheels the handle should be moved away from the ground roller to lengthen the moment arms from the roller; to increase the downward pressure on the roller, conversely the space of the handle from the wheel must be increased. This, however, considers the wheels and roller as anchored. When the mower is in use the forward component of the force on the handle acting against the ground exerts a turning moment on the wheel. If the reel were to run perfectly free, this would have no effect on the pressure of wheels against the ground, and probably for this reason the actual effect of this turning moment has never been properly utilized in prior mower designs.

To the extent that the reel is not free to turn, but is resisted by the grass or other material engaged between the cutter blades and cutter bar, this turning movement is transmitted to the frame. According to the present invention this effect is utilized to increase the traction of the wheels.

In operation of the mower force is applied through the handle to the frame at an angle which may be resolved into a component perpendicular to the radius of the ground roller (which produces a direct downward pressure on the wheels by the turning moment around the roller) and a second component parallel to the ground (which tends to produce forward motion). The latter, however, due to the traction of the wheel produces a turning moment on the wheel; and this as already stated is transmitted to the frame to the extent that rotation of the reel is resisted. When the handle is located as in the prior art, this moment tends to lift the frame and the roller off the ground in what has heretofore been referred to as bucking. If, however, the handle is properly placed according to the present invention, the force tending to lift the frame due to this turning moment is always less than the component of the force on the handle which exerts an opposite turning moment about the frame; therefore, the frame cannot buck and the force instead is smoothly applied against the handle stimulating a greater force by the operator with the result of increasing the pressure of the wheels against the ground, i. e., the traction.

The angle of attack of the handle is important because it determines both the components of the applied force which acts directly to press down the ground wheels and the turning moment exerted on the frame in opposition to that exerted by the reaction of the reel drive.

The placing of the point of attachment of the handle according to the invention requires that the moment of force applied to the handle shall be at least equal to the moment of the reaction force applied to the frame from the wheels when the reel is blocked.

Due to the angle between the handle and the frame and the positioning of connections 212 the force exerted on the handle serves to hold both the ground wheels 24 and the ground roller 34 against the ground and in the event that the reel becomes blocked by some obstacle which it cannot cut tractive effort and inertia reacts directly against the handle instead of causing the ground wheels and cutter bar to jump as in the older constructions.

In conventional types of mower constructions it will be understood that in order to increase the height of cut of the mower, the ground roller (corresponding to the roller 34 in the drawings) is lowered with respect to its points of connection with the frame to thus raise the forward edge of the cutter bar which is positioned between the roller and a vertical plane including the axis of the wheels. Thus when the present invention is applied to conventional types of mowers care should be taken that the line of pivotal connection between the handle and the frame is sufficiently far back on the frame to accomplish the purposes of the present invention when the mower is adjusted for its extreme maximum height of cut, as the increasing of the height of cut in such conventional types of lawn mowers will have a tendency to cause the line of force from the handle to advance its position or point of intersection with the ground forwardly with respect to the ground wheels. The opposite effect, however, is present in the construction illustrated in Figs. 1 to 8 hereof as in this case when the height of cut is increased it is accomplished by pivoting the frame about the axis of the ground roller and consequently the pivotal axes between the links or arms 214 with the members 210 move rearwardly with respect to the axes of the wheels and ground roller. Accordingly, where the invention is applied in the manner illustrated in Figs. 1 to 9 hereof the point of connection between the handle and the frame should be designed to meet the requirements stated when the reel is in its lowest position, in other words in a position to effect a minimum height of cut.

On the other hand the construction shown in Figs. 1 to 9 hereof may be easily modified in such a manner that any adjustment of the mower to effect a variation in the height of cut has no effect whatever in raising or lowering the line of pivotal connection between the mower and handle and ground, the only effect in this case being the effect on the torque applied to overcome the resistance of the cut between the reel and the cutter bar which resistance will increase as the height of cut is increased. This is accomplished in the simple manner illustrated in Fig. 10 in which all parts shown are identical to those shown in the previous view except that in this case instead of securing the member 210 to the frame of the mower they are instead secured upon the axially outer faces of the gear casings 22. Inasmuch as the gear casings 22 remain in the same horizontal position regardless of adjustment of the mower to vary the height of cut thereof, it will be appreciated that the pivotal point of connection between the handle and the mower in the case illustrated in Fig. 10 will remain in fixed position during any adjustment of the mower for height of cut.

Figure 10:
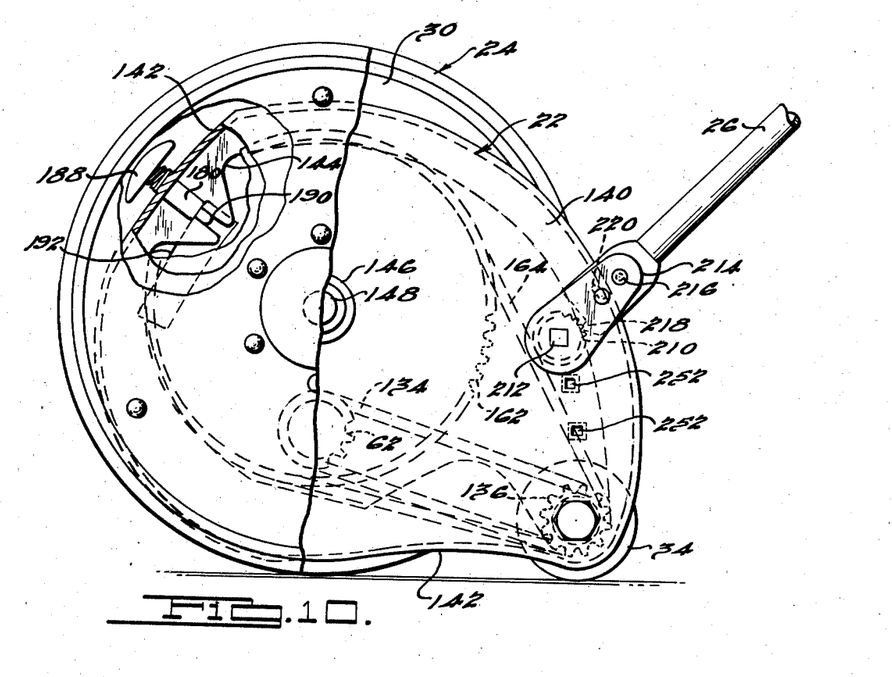

One other feature is illustrated in Fig. 10 which is of advantage in connection with the present invention and that is each gear casing 22 is provided with a plurality, shown as three for the purpose of illustration only, of holes 252 for reception of the connection 212. In this case the uppermost hole 252 may be positioned approximately at the upper limits of the position of the chain housing required to obtain the above described purposes of the present invention and the effects of the present invention will necessarily be increased by shifting the connections 212 from the upper opening 252 to the lower openings 252, the greatest effect, of course, being when the connection 212 is shifted to the lowermost opening 252. The latter condition is found to be particularly desirable where the mower is employed for mowing relatively steep terraces. This ability to shift the point of connection between the handle and the mower to a lower position than the point of connection actually illustrated in the drawings is also important where the mower is to be operated by an unusually short operator and so that the advantages of the present invention may still be realized by such operator with the handle at an unusually small angularity with respect to the ground, as it will be realized that the height at which the outer end of the handle is maintained during operation has a material effect in realizing the desired effects of the present invention and that ordinarily a mower will be designed and constructed for operation by persons of normal stature.

Formal changes may be made in the specific embodiment of the invention described without departing from the spirit and substance of the invention, the scope of which is commensurate with the appended claims.

What I claim is:

1. In combination with a lawn mower having a substantially rigid frame, a wheel on each side of said frame making tractive contact with the ground, a rotary cutting reel comprising spiral fly knives mounted on said frame between said wheels, means operatively connecting said reel and said wheels to cause rotation of said reel when said wheels are rotated, a handle attached to said frame and a bed knife positioned to make a shearing contact with said fly knives when said reel is rotated; means for pivotally attaching said handle to each side of the frame at a point below the horizontal plane of the axis of said wheels and to the rear of the axis of said cutting reel.

2. In a lawn mower having a pair of axially spaced ground wheels, a cutter reel, a frame structure interconnecting said cutter reel and ground wheels, a cutter bar supported by said frame structure in operative relation with respect to said cutter reel, a ground roller secured relative to said frame in parallel and rearwardly spaced relation with respect to said ground wheels, and means for adjusting the vertical height of the operative edge of said cutter bar with respect to the ground; a handle pivotally secured to said frame structure, the line of pivotal connection between the handle and the frame structure being such that the line of force exerted through the handle to the frame structure when the handle is in normal position intersects the ground at a point not materially in advance of a line connecting the points of contact of the ground wheels with the ground, and the vertical distance of the pivotal point of connection of the handle and the frame structure with respect to the ground remaining fixed during adjustment of said means to vary the height of cut.

3. In a lawn mower structure, in combination, a rigid frame structure, a reel rotatably supported thereby, a cutter bar supported thereby in operative relation with respect to said reel, a ground roller rotatably associated with said frame, a pair of ground wheels, means rotatably secured relative to said ground wheels and pivotally secured with respect to said frame providing support for said frame through said ground wheels, a handle pivotally secured to said frame, the line of pivotal connection between the handle and the frame being such that the line of force applied to the frame through the handle in propelling the mower intersects the ground at a point not materially in advance of the line connecting the points of contact of the ground wheels with the ground.

4. In a lawn mower having a frame, a cutter reel rotatably supported by the frame, a cutter bar supported by the frame in operative relation with respect to the cutter reel, a ground roller rotatably mounted in fixed relation with respect to the frame, a pair of ground wheels in advance of the ground roller, and a housing member rotatably mounted with respect to each of said ground wheels and pivotally adjustably secured relative to said frame along the line eccentric to the axis of the ground wheel; a handle, and means pivotally connecting said handle to said housing member.

5. In a lawn mower having a frame, a cutter reel rotatably supported by the frame, a cutter bar supported by the frame in operative relation with respect to the cutter reel, a ground roller rotatably mounted in fixed relation with respect to the frame, a pair of ground wheels in advance of the ground roller, and a housing member rotatably mounted with respect to each of said ground wheels and pivotally adjustably secured relative to said frame along the line eccentric to the axis of the ground wheel; a handle, and means interconnecting said handle and said housing members about a line positioned rearwardly of the axis of the cutter reel and below the axes of said ground wheels.

6. In a lawn mower having a frame, a cutter reel rotatably supported by the frame, a cutter bar supported by the frame in operative relation with respect to the cutter reel, a ground roller rotatably mounted in fixed relation with respect to the frame, a pair of ground wheels in advance of the ground roller, and a housing member rotatably mounted with respect to each of said ground wheels and pivotally adjustably secured relative to said frame along the line eccentric to the axis of the ground wheels; a handle, and means for pivotally securing said handle in any one of a plurality of different positions to said housing members.

7. In a lawn mower having a frame, a cutter reel rotatably supported by the frame, a cutter bar supported by the frame in operative relation with respect to the cutter reel, a ground roller rotatably mounted in fixed relation with respect to the frame, a pair of ground wheels in advance of the ground roller, and a housing member rotatably mounted with respect to each of said ground wheels and pivotally adjustably secured relative to said frame along the line eccentric to the axis of the ground wheel; a handle, and means for pivotally securing said handle to said housing member in any one of a plurality of different vertical positions.

8. In a lawn mower having a frame structure, ground wheels, cutter reel and a cutter bar operatively associated therewith, and a handle pivotally secured relative to said frame structure for effecting propulsion or the like of said mower, the pivotal point of connection of said handle with said frame structure being such that the line of force exerted through said handle through the mower intersects the ground at a point not materially in advance of the line connecting the points of contact of the ground wheels with the ground, and means for varying the height of cut of said mower, said point of intersection of said line of force with the ground moving rearwardly with respect to said line connecting the points of contact of the ground wheels with the ground during adjustment of said means to increase said height of cut.

9. In a lawn mower having a frame, the combination of means providing a notched surface fixed in respect to said frame, an arm pivotally mounted on said frame in adjacent relationship with respect to said notched surface, a handle pivoted to said arm for movement about a line spaced from the pivotal axis of said arm, and means on said handle inter-engageable with said notched surface and cooperable therewith through said arm to releasably lock said handle and arm against rotation in one direction only.

10. A lawn mower having a frame, the combination of means fixed to said frame providing an arcuate notched surface, an arm pivoted to said frame for pivotal movement about a line approximately coincident with the axis of said arcuate surface, a handle pivoted to said arm outwardly of the pivotal connection between it and said frame, and a tooth on said handle inwardly of the point of pivotal connection between it and said arm so constructed and arranged as to be engageable with said notched surface, the distance between the tip of said tooth and the pivotal connection between said arm and handle being greater than the distance between the pivotal connection between said arm and handle and said notched surface whereby movement of said handle about its pivotal connection with said arm in one direction will release said tooth from engagement with said notched surface and permit bodily movement of both said handle and said arm about the pivotal connection between said arm and frame, and pivotal movement of said handle about its line of pivotal connection with said arm in the opposite direction will cause engagement of said tooth with said notched surface and thereby lock said handle against further pivotal movement in the last mentioned direction.

11. In combination with a lawn mower including a frame, a handle pivotally associated with said lawn mower and means for releasably supporting said handle in any one of a plurality of pivotally adjusted positions comprising, in combination, a member having a notched surface fixed with respect to said frame, a link pivotally mounted with respect to said frame in adjacent relationship with respect to said notched surface, a handle pivotally secured to said link at a point thereon spaced with respect to its pivotal axis with respect to said frame, and means carried by said handle engageable with said notched surface upon relative pivotal movement between said handle and said link in one direction and releasable from engagement therewith upon pivotal movement between said handle and said link in the opposite direction, the aforementioned parts being so constructed and arranged that engagement of said means and said notched surface locks both said handle and said link against pivotal movement with respect to said frame in one direction.

12. A lawn mower having a frame, the combination of means fixed to said frame providing an arcuate notched surface, an arm pivoted to said frame for pivotal movement about a line approximately coincident with the axis of said arcuate surface, a handle pivoted to said arm outwardly of the pivotal connection between it and said frame, and a tooth on said handle inwardly of the point of pivotal connection between it and said arm so constructed and arranged as to be engageable with said notched surface, the distance between the tip of said tooth and the pivotal connection between said arm and handle being greater than the distance between the pivotal connection between said arm and handle and said notched surface whereby movement of said handle about its pivotal connection with said arm in one direction will release said tooth from engagement with said notched surface and permit bodily movement of both said handle and said arm about the pivotal connection between said arm and frame, and pivotal movement of said handle about its line of pivotal connection with said arm in the opposite direction will cause engagement of said tooth with said notched surface and thereby lock said handle against further pivotal movement in the last mentioned direction, and means cooperating between said handle and said link limiting the amount of relative pivotal movement between them.

HENRY C. LIMBACH.